United States Patent

Wober et al.

[11] Patent Number: 5,870,505
[45] Date of Patent: Feb. 9, 1999

[54] METHOD AND APPARATUS FOR PIXEL LEVEL LUMINANCE ADJUSTMENT

[75] Inventors: Munib A. Wober, Haverhill; Ibrahim Hajjahmad, Sommerville, both of Mass.

[73] Assignee: Polaroid Corporation, Cambridge, Mass.

[21] Appl. No.: 615,387

[22] Filed: Mar. 14, 1996

[51] Int. Cl.⁶ ............... G06K 9/38; G06K 9/40; H04N 1/40

[52] U.S. Cl. ............ 382/274; 382/272; 358/448; 358/447; 358/465

[58] Field of Search ............... 382/274, 272, 382/275; 358/426, 432, 433, 448, 462, 464, 465, 447

[56] References Cited

U.S. PATENT DOCUMENTS

| | | | |
|---|---|---|---|
| 4,703,363 | 10/1987 | Kitamura | 358/448 |
| 4,747,156 | 5/1988 | Wahl | 382/275 |
| 4,841,374 | 6/1989 | Kotani et al. | 358/464 |
| 4,903,316 | 2/1990 | Hongo et al. | 382/272 |
| 4,999,629 | 3/1991 | Katsuta | 358/462 |
| 5,235,434 | 8/1993 | Wober | 358/448 |

OTHER PUBLICATIONS

U.S. Patent Application No. 08/414,750 filed Mar. 31, 1995 by Boyack & Juenger.

Primary Examiner—Thomas D. Lee
Attorney, Agent, or Firm—Donald F. Mofford

[57] ABSTRACT

A method for adjusting the luminance $IM_{HI}$ of pixels in a high resolution image includes first forming a low resolution image of the original by grouping pixels into superpixels such as 8×8 blocks. A low resolution luminance correction value $\delta_{LO}$ is determined for each superpixel by comparing the luminance of the superpixel to both a predetermined darkness threshold $T_D$ and a predetermined brightness threshold $T_B$. The low resolution luminance correction value $\delta_{LO}$ is modified to yield $\delta'_{LO}$ for each superpixel by forming islands of the superpixels and smoothing $\delta_{LO}$ between superpixels within each island. Finally, a high resolution luminance correction value $\delta_{HI}$ is calculated for each pixel of the original high resolution image by comparing the luminance $IM_{HI}$ of each pixel to both $T_D$ and $T_B$, keeping in mind that $\delta_{HI}$ is generated through a series of mathematical computations as a function of both the pixel luminance $IM_{HI}$ and the low resolution luminance correction value $\delta_{LO}$. Each pixel of the original image is adjusted by the corresponding high resolution luminance correction value $\delta_{HI}$ and a luminance adjusted image is produced.

6 Claims, 13 Drawing Sheets

SIZE(i,j)=1  FIGURE 5A

SIZE(i,j)=2  FIGURE 5B

SIZE(i,j)=3  FIGURE 5C

SIZE(i,j)=4  FIGURE 5D

SIZE(i,j)=5  FIGURE 5E

METHOD AND APPARATUS FOR PIXEL LEVEL LUMINANCE ADJUSTMENT

FIELD OF THE INVENTION

This invention relates generally to a method and apparatus for improving the quality of photographic images and, more particularly, to improving digital images by pixel level brightness adjustments.

BACKGROUND OF THE INVENTION

Anyone acquiring an image needs to have a permanent record which faithfully reproduces the original subject or scene, or at least those aspects of the subject or scene which are considered most important. The quality of the reproduction is judged by visually comparing the hardcopy with the original scene. In making this judgment an observer in part compares the brightness of various points in the hardcopy with the brightness of corresponding points in the original scene and thereby forms a subjective opinion about the quality of the reproduction. Exact subjective tone reproduction requires that the brightness of each point in the hardcopy equals that of the brightness of a corresponding point in the original scene. However, as those skilled in the arts know, exact subjective tone reproduction is extraordinarily difficult and inconvenient to achieve because hardcopy media from printers, and media from other devices (such as electronic cameras, scanners, monitors, etc.) are generally viewed at illumination levels which are significantly less than those under which an original was created—original photographs typically being about 1/100 that of the original scene. Also, most hardcopy or electronic media have a limited ability to capture the range of tones which typically exist in nature. Nevertheless, satisfactory subjective tone reproduction can, in part, be obtained if the perceptible brightness of the image on the medium appears similar to the brightness of the original scene.

To assure that the foregoing conditions are satisfied depends, in part, on properly matching the luminance range of the scene to the tone scale of the medium, taking into account the particular scene characteristics to be emphasized, prevailing scene lighting conditions, and the medium reproduction characteristics. The issue of matching the luminance range of the scene to the tone scale of the medium was addressed in the Scene Analysis method of U.S. patent application Ser. No. 08/414,750 filed Mar. 31, 1995 by James R. Boyack and Andrew K. Juenger. Specifically, an image is partitioned into blocks and certain blocks are combined into sectors. An average luminance block value is determined for each block and a difference is determined between the maximum and minimum average luminance block values for each sector. If the difference exceeds a predetermined threshold value, then the sector is labeled as an active sector and an average luminance sector value is obtained from maximum and minimum average luminance block values. All active sectors of the image are plotted versus the average luminance sector values in a histogram, then the histogram is shifted via some predetermined criterion so that the average luminance sector values of interest will fall within a destination window corresponding to the tonal reproduction capability of a destination application. The result of the Scene Analysis is a global balancing of the image brightness by large scale luminance adjustment.

Certain areas of the image typically still require luminance adjustments following Scene Analysis. These adjustments highlight and enhance specific regions of interest in the image in order to prevent loss of details and the subsequent reduced image quality. For instance, scenes with a large shaded region adjacent to a bright region are especially difficult to develop or display without loss of some image quality in either or both of the dark and bright regions. This type of luminance adjustment was addressed in U.S. Pat. No. 5,235,434 issued Aug. 10, 1993 to Munib Wober.

The method of patent '434 includes a first pass through an image compensation stage, the image being partitioned into groups of pixels called superpixels. Each superpixel is individually processed to determine whether it is part of a larger grouping (i.e. region) of superpixels which all fall beyond predefined darkness or brightness threshold values. Each superpixel is given a SIZE value and an AVERAGE luminance value for all pixels resident in the given superpixel.

In a second pass through the image compensation stage, the amount of luminance adjustment for each region of superpixels is determined in relation to both the corresponding SIZE and AVERAGE values. For small and intermediate regions, a smoothing function is applied to prevent the appearance of artifacts along the borders of the superpixel.

Further luminance adjustment is sometimes necessary at the pixel level. Thus, the present invention is primarily directed at an improved system and method for performing pixel level luminance adjustments of a digital image which is independent of large area luminance averaging. This and other objects will become apparent in view of the following description, drawings and claims.

SUMMARY OF THE INVENTION

A method for adjusting the luminance $IM_{HI}$ of pixels in a high resolution image includes first forming a low resolution image of the original by grouping pixels into superpixels such as 8×8 blocks. A low resolution luminance correction value $\delta_{LO}$ is determined for each superpixel by comparing the luminance of the superpixel to both a predetermined darkness threshold $T_D$ and a predetermined brightness threshold $T_B$. The low resolution luminance correction value $\delta_{LO}$ is modified to yield $\delta'_{LO}$ for each superpixel by forming islands of the superpixels and smoothing $\delta_{LO}$ between superpixels within each island. Finally, a high resolution luminance correction value $\delta_{HI}$ is calculated for each pixel of the original high resolution image by comparing the luminance $IM_{HI}$ of each pixel to both $T_D$ and $T_B$, keeping in mind that $\delta_{HI}$ is generated through a series of mathematical computations as a function of both the pixel luminance $IM_{HI}$ and the low resolution luminance correction value $\delta_{LO}$. Each pixel of the original image is adjusted by the corresponding high resolution luminance correction value $\delta_{HI}$ and a luminance adjusted image is produced.

DETAILED DESCRIPTION OF THE PREFERRED EMBODIMENTS

1. A System For Pixel Level Luminance Adjustment

Figure 1:
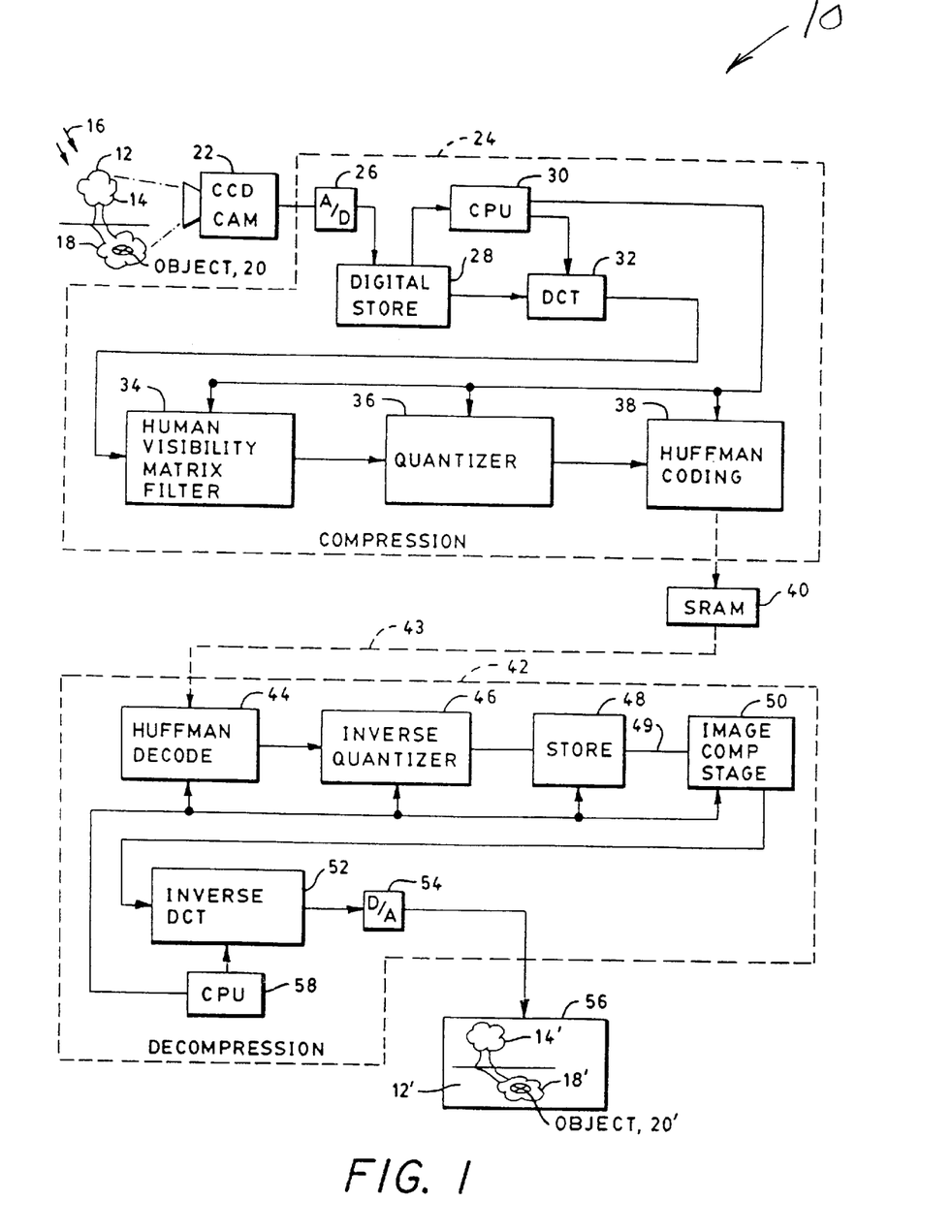
FIG. 1 is a schematic block diagram of a system for compressing the digital image data of a scene including apparatus for pixel level luminance adjustment according to the present invention.

FIG. 1 shows one preferred embodiment of a system 10 for capturing an image 12, compressing and storing the image for display at a later time, and decompressing the stored image and displaying the same. In the illustration the image 12 comprises a tree 14 which is illuminated by ambient light (arrow 16) casting a shadow 18 on the ground as illustrated. An object 20 is located in the shadow 18. The illustrative image 12 has a large dynamic range. If the object 20 is located partially or entirely within the shadow 18, but for the present invention, some information will normally be lost. It should be understood that the object 20 may be in a bright area (not shown) and the principles of the invention would be equally applicable for rendering the object visible as hereinafter described.

The image 12 is captured by an input device such as a CCD camera 22 and is processed by an image processing device or compression stage 24. The camera 22 may be directly coupled to an analog to digital converter 26 in the compression stage 24 which produces a digital image signal. A storage device 28 receives and stores the data, and a central processing unit 30 clocks the image signal to the storage device 28 and governs the operation of other devices.

The stored image data is fed to a discrete cosine transform or DCT 32 which converts the digital information into a series of coefficients. The transformed data is thereafter coupled to a human visibility matrix filter 34 which discards certain high frequency coefficients considered to be relatively unimportant to good picture quality. For example, certain high frequency color information is filtered out because it is not readily perceived by the human eye and thus the information may be simplified for later processing. The transformed and filtered digital data is thereafter quantized in a quantizer 36 which establishes selected levels of the digital data in a given range of discrete available levels. The quantized data is then encoded by means of a Huffman coding device 38 which compresses the quantized data by a known encoding technique. It should be understood that coding algorithms other than Huffman coding may be employed if desired. The encoded information may then be thereafter stored in a storage device such as a static RAM (SRAM) 40.

If desired at some later time, the information in SRAM 40 may be fed to an image processing apparatus or decompression stage 42 by any convenient transmission link 43. Here a Huffman decoding device 44 decodes the data which is then coupled to an inverse quantizer 46. In accordance with the present invention the data stored in storage device 48 is coupled to an image compensation stage 50 which electronically processes the data according to the inventive method so as to selectively adjust the brightness of each pixel of the image 12 within the shadow 18, thereby enhancing the image and retrieving otherwise lost information. The compensated data is converted to digital data by means of inverse DCT 52. Thereafter the data may be converted to an analog signal by digital to analog converter 54 which is coupled to display 56. A modified version of the original image 12 is reproduced as displayed image 12' including the tree 16', the shadow 18' and the object 20' which is enhanced and more clearly visible in display 54. CPU 58 in the compression stage 42 regulates the various devices therein as illustrated and may manipulate the data as hereinafter described.

The general description of the overall system 10 illustrated in FIG. 1 employs processing techniques designed to reduce the amount of computation and thereby speed up the process of selectively adjusting the image 12. In image compensation stage 50, each block of pixels is transformed using the DCT 32 so that the information has the form of a series of coefficients. In accordance with a technique employed in the present invention, the first coefficient of each block of pixels in the domain of the DCT is referred to as the DC (direct current) value and represents an approximate brightness level of the pixel. When the data is decompressed it may likewise be stored in a similar format. If the DC value is within an acceptable level of brightness as defined by darkness threshold $T_D$ and brightness threshold $T_B$, the luminance level of the block of pixels is not modified. Under certain conditions, if the DC value is outside of an acceptable brightness level, the pixel is modified to bring out the luminance information. In accordance with the invention, an algorithm or process is employed which modifies or selectively changes the DC value (i.e. the luminance value) by an amount $\delta_{LO}$ in the DCT domain for each block of pixels stored in storage device 48.

It should be understood that the image compensation stage 50 may be alternatively employed conveniently in the compression stage 24 between human visibility matrix filter 34 and quantizer 36, or directly after the A/D converter 26. This is especially useful where it is desired to form and transmit a corrected image such as a TV image to a plurality of receivers which do not have image compensation capability. The corrected image would then simply be decompressed without further image adjustment in decompression stage 42.

2. A Method For Pixel Level Luminance Adjustment

Figure 2:
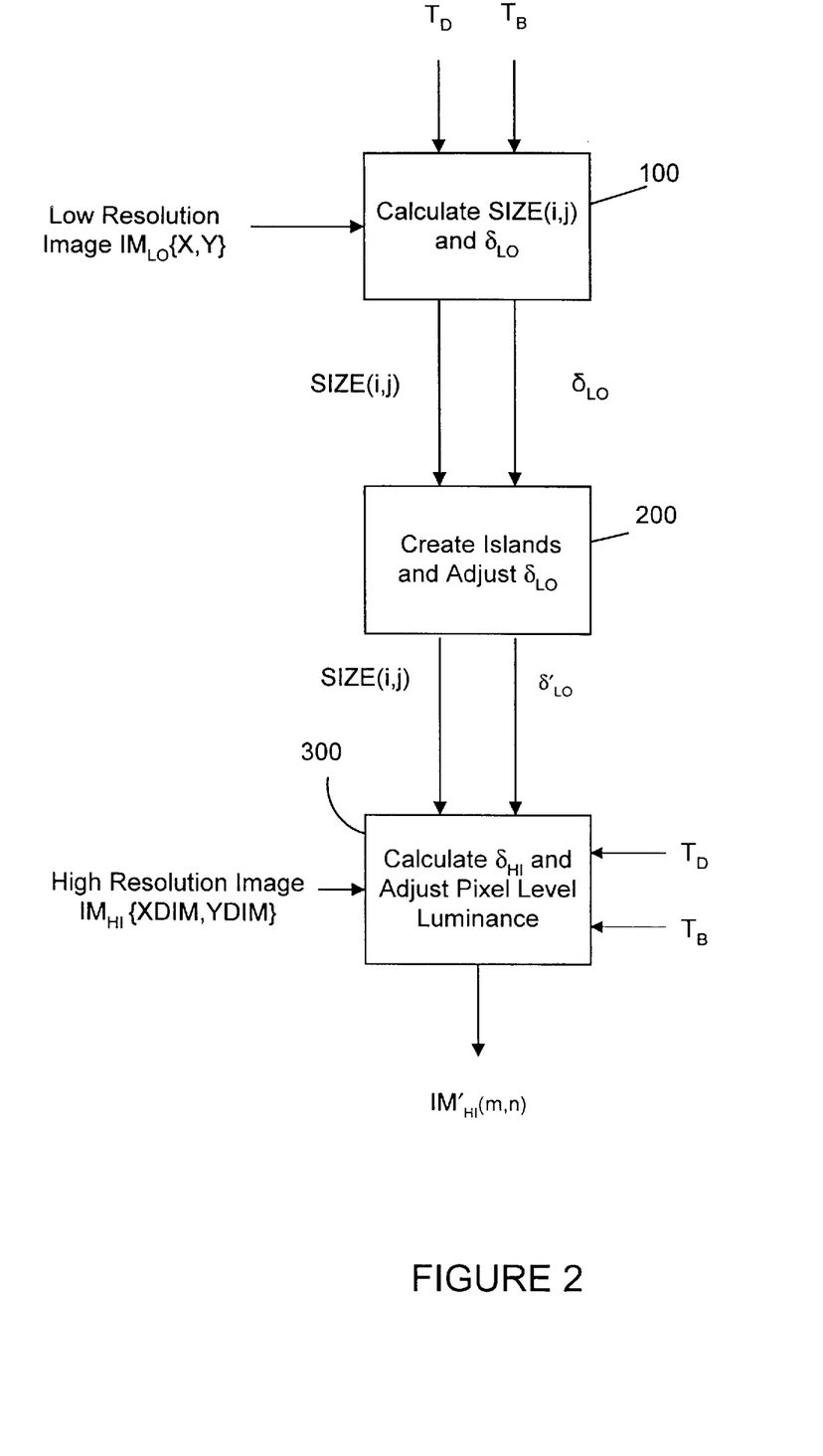
FIG. 2 is a block diagram overview of the inventive method for pixel level luminance adjustment.

The inventive pixel level luminance adjustment method can be thought of as consisting of three parts as shown in FIG. 2. The first part 100 determines the parameters SIZE (i,j) and $\delta_{LO}$. SIZE(i,j) is an integer value designating the size of the neighborhood of the superpixels that were used in testing for a particular superpixel having a luminance S0(i,j), which is being considered for estimating the amount of luminance adjustment necessary. The values $IM_{LO}(i,j)$, which is the low resolution luminance of a superpixel, and $\delta_{LO}$, which is the low resolution luminance correction value of a superpixel, are identical, respectively, to the values S0(i,j) and AVERAGE(i,j) calculated in U.S. Pat. No. 5,235, 434. The low resolution luminance correction value $\delta_{LO}$ is calculated for each superpixel, then it is applied to each low resolution pixel within that superpixel. The second part of the inventive luminance adjustment method creates islands of pixels which require luminance adjustment, as well as determining a modified low resolution luminance correction value $\delta'_{LO}$ based on the islands that were created. The third part of the inventive luminance adjustment method calculates a high resolution luminance correction value $\delta_{HI}$ and adds it to the luminance value for each pixel of the high resolution image $IM_{HI}$ to generate a high resolution luminance adjusted image $IM'_{HI}$.

Figure 3:
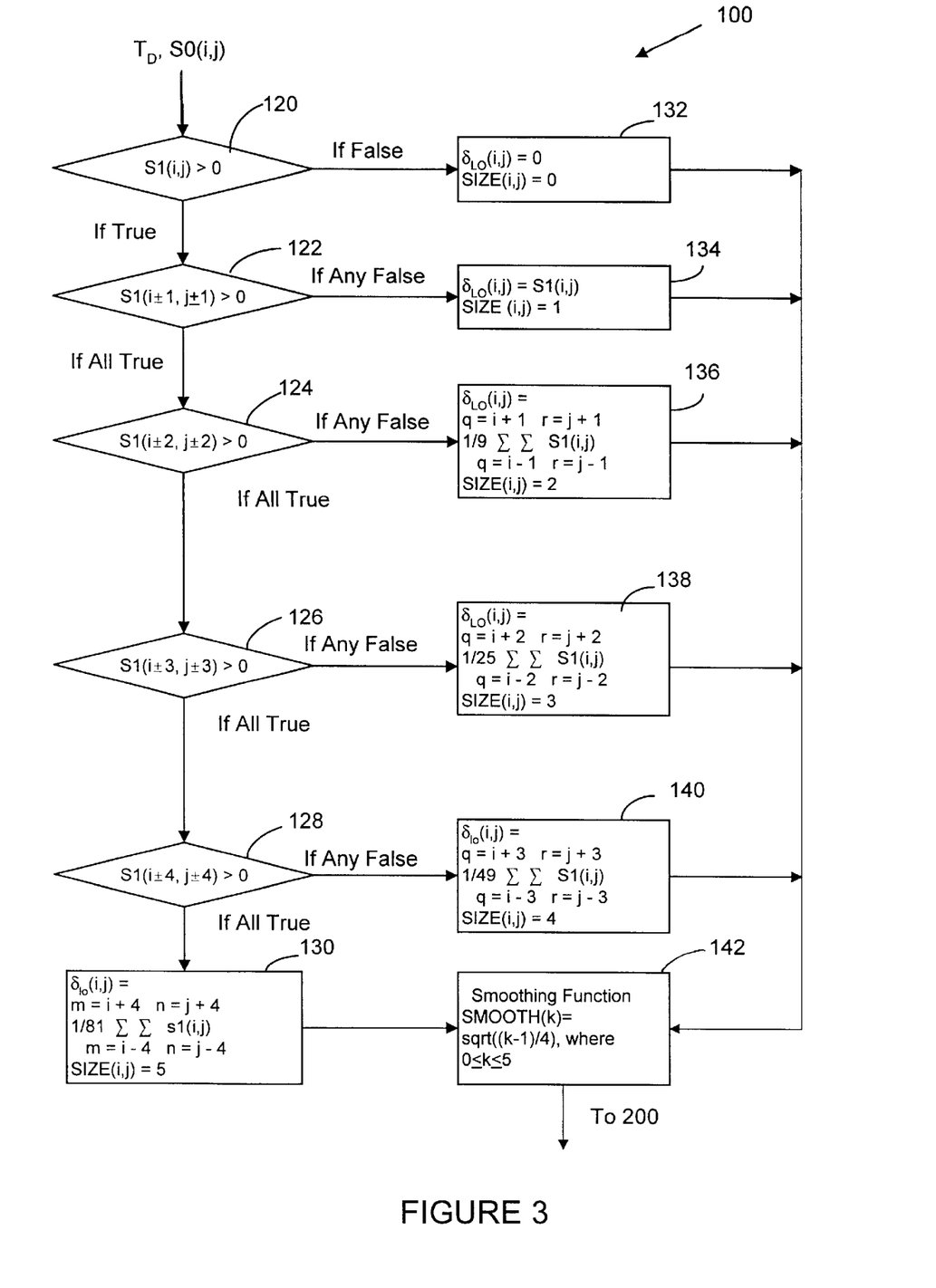
FIG. 3 is a flow diagram of part of block 100 of the FIG. 2 method for brightening a superpixel which has a luminance value below some predetermined darkness threshold $T_D$.
Figure 4:
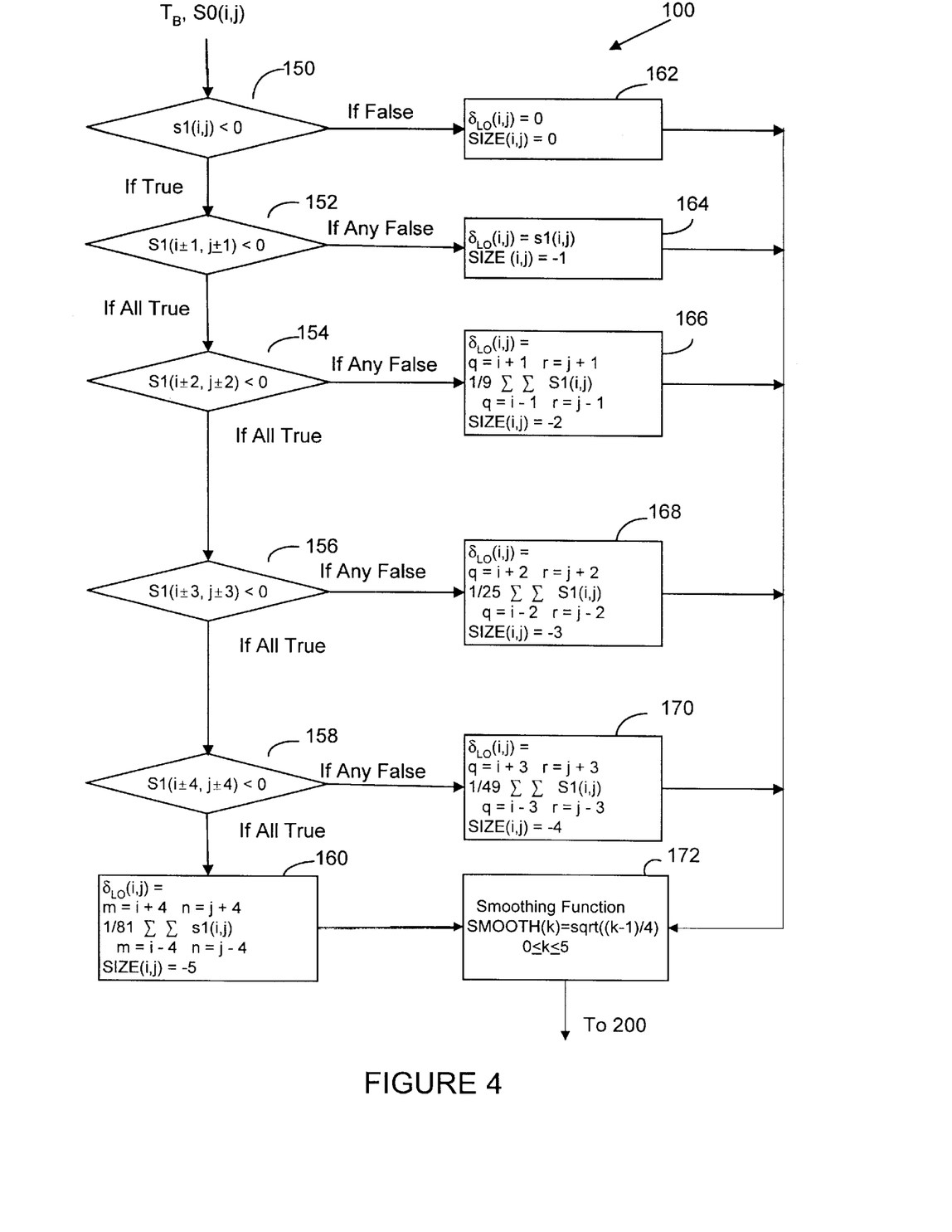
FIG. 4 is a flow diagram of part of block 100 of the FIG. 2 method for darkening a superpixel which has a luminance value above some predetermined brightness threshold $T_B$.

Detailed steps of the first part, block 100, are shown in FIG. 3 for determining S1(i,j) by comparing superpixel luminance S0(i,j) with darkness threshold $T_D$, and in FIG. 4 for determining S1(i,j) by comparing superpixel luminance S0(i,j) with brightness threshold $T_B$. In other words each superpixel, S0(i,j), of the low resolution image, $IM_{LO}$, must traverse through both the steps of FIG. 3 which tests whether the superpixel is too dark and needs to be brightened, and FIG. 4, which tests whether the superpixel is too bright and needs to be darkened.

Equation (1) is useful for determining whether the luminance level of a superpixel of interest is within an acceptable range. S0(i,j) is defined as the luminance of the superpixel of interest, where $0 \leq i < X$, $0 \leq j < Y$, for row i, column j in a low resolution image containing X total rows and Y total columns (i, j, X and Y are integers). S1(i,j) as defined in equation (1) is an indicator of whether the luminance S0(i,j) of the superpixel is greater than, equal to, or less than some predetermined luminance threshold.

$$S1(i,j) = \text{threshold} - S0(i,j) \quad (1)$$

The first threshold useful in equation (1) is the darkness threshold $T_D$ defined as the minimum luminance acceptable for a given superpixel. The other threshold useful in equation (1) is the brightness threshold $T_B$ defined as the maximum luminance acceptable for a given superpixel. When the luminance value of any superpixel is below the darkness threshold $T_D$, the luminance of the given superpixel will be raised towards the darkness threshold $T_D$. Similarly, when the luminance value of any superpixel is above the brightness threshold $T_B$, the luminance value of the superpixel will be lowered towards the brightness threshold $T_B$. As defined, the value S1(i,j) could be negative, positive or zero. If luminance S0(i,j) is being compared to the darkness threshold $T_D$, then a positive value of S1(i,j) means that the luminance of the superpixel is below the darkness threshold $T_D$ and S1(i,j) must be raised. If S0(i,j) is being compared to the brightness threshold $T_B$, then a negative value of S1(i,j) means that the luminance of the superpixel is above the brightness threshold $T_B$ and the luminance S0(i,j) must be lowered.

Block 100 of FIG. 2 first follows the steps of FIG. 3 to determine whether the superpixel of interest requires brightening. If S1(i,j) is less than or equal to zero, then the luminance S0(i,j) of the superpixel is greater than or equal to some predetermined darkness threshold $T_D$ and no luminance adjustment is necessary for that superpixel. The low resolution luminance correction value $\delta_{LO}$, and SIZE(i,j) are both set equal to zero in block 132. However, if S1(i,j) is greater than zero in block 120, then the luminance S0(i,j) is lower than the darkness threshold $T_D$ and the superpixel must be brightened. At this point in time it is necessary to determine what degree of brightening is necessary. This is done by increasing the size of the neighborhood around the superpixel, i.e. increasing the radius of the search of the pixels surrounding the superpixel of interest, then individually testing in blocks 122, 124, 126 and 128 each of the surrounding low resolution pixels against the darkness threshold $T_D$. An average low resolution luminance correction value $\delta_{LO}$ for the superpixel is determined in blocks 134, 136, 138, 140 and 130 by averaging the luminance of all the surrounding low resolution pixels.

Figure 5A:
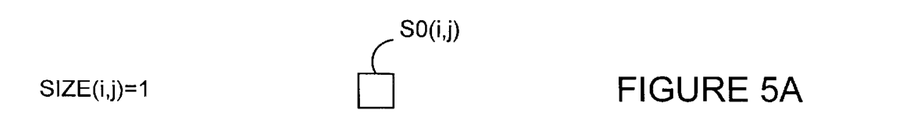
FIGS. 5A–5E show different size superpixels corresponding to SIZE(i,j) values of 1 to 5.
Figure 5B:
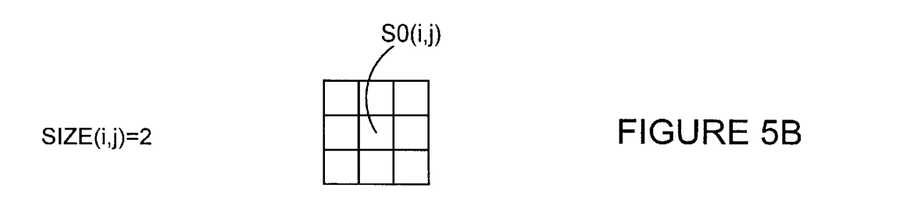

Block 122 tests if S1 is greater than zero for all low resolution pixels of the 3×3 group shown in FIG. 5B. If block 122 is false for any low resolution pixel of FIG. 5B, then SIZE(i,j) is set equal to 1 and the low resolution luminance correction value $\delta_{LO}$ is set equal to S1(i,j) in block 134. If block 122 is true for all low resolution pixels of FIG. 5B, then a larger group of surrounding low resolution pixels will be tested in block 124. Block 124 tests if S1 is greater than zero for all 25 low resolution pixels of FIG. 5C. If block 124 is false for any pixel of FIG. 5C, then block 136 sets SIZE(i,j) equal to 2 and the low resolution luminance correction value $\delta_{LO}$ equal to ⅑ of the value of all the low resolution pixels within the 3×3 region according to equation (2).

$$\delta_{LO}(i,j) = 1/9 \sum_{q=i-1}^{q=i+1} \sum_{r=i-1}^{r=i+1} S1(i,j) \quad (2)$$

Figure 5C:
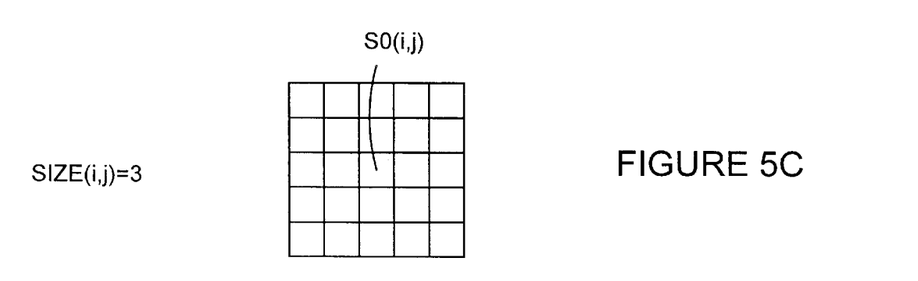

If block 124 is true for all pixels of FIG. 5C, then a larger group of surrounding low resolution pixels will be tested in block 126. If block 126 is false for any low resolution pixel of FIG. 5D, then block 138 sets SIZE(i,j) equal to 3 and the low resolution luminance correction value $\delta_{LO}$ equal to the average value of all the low resolution pixels in the 5×5 region according to equation (3).

$$\delta_{LO}(i,j) = 1/25 \sum_{q=i-2}^{q=i+2} \sum_{r=i-2}^{r=i+2} S1(i,j) \quad (3)$$

Figure 5D:
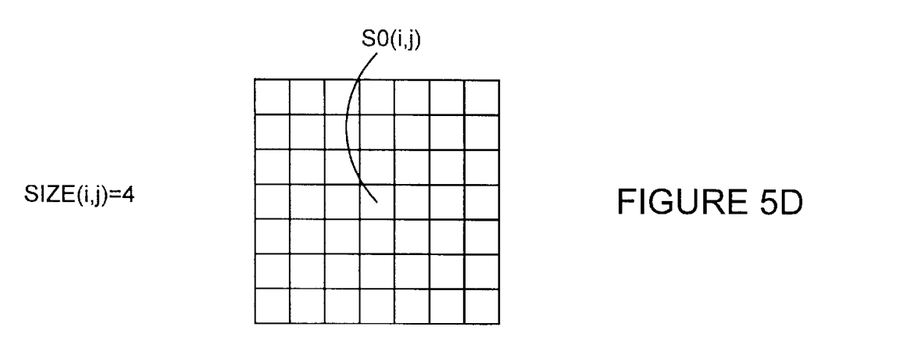

If block 126 is true for all pixels of FIG. 5D, then a larger group of surrounding low resolution pixels will be tested in block 128. If block 128 is false for any low resolution pixel of FIG. 5E, then block 140 sets SIZE(i,j) equal to 4 and the low resolution luminance correction value $\delta_{LO}$ equal to the average value of all the low resolution pixels in the 7×7 region according to equation (4).

$$\delta_{LO}(i,j) = 1/49 \sum_{q=i-3}^{q=i+3} \sum_{r=i-3}^{r=i+3} S1(i,j) \quad (4)$$

Figure 5E:
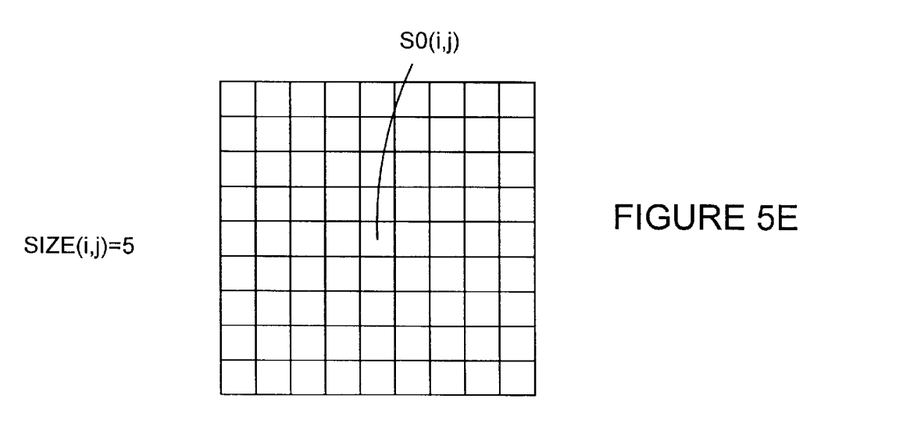

If block 128 is true for all low resolution pixels of FIG. 5E, then block 130 sets SIZE(i,j) to 5 and the low resolution luminance correction value $\delta_{LO}$ equal to the average value of all the low resolution pixels in the 9×9 region as shown in equation (5).

$$\delta_{LO}(i,j) = 1/81 \sum_{q=i-4}^{q=i+4} \sum_{r=i-4}^{r=i+4} S1(i,j) \quad (5)$$

The outputs to blocks 132, 134, 136, 138 and 140 all feed into block 142 which generates a smoothing function such as the one given in equation (6).

$$\text{SMOOTH}(k) = \sqrt{(k-1)/4} \,, \quad (6)$$

where $0 \leq k \leq 5$

The luminance S0(i,j) is then adjusted according to the smoothing function so that S0(i,j)=S0(i,j)+{SMOOTH(k) *$\delta_{LO}$(i,j)}.

After it is determined whether the superpixel is too dark and needs to be brightened (as described above in coordination with FIG. 3), then it must be ascertained whether the superpixel is too bright and needs to be darkened. This is done according to the flow diagram of FIG. 4. In block 150, if S1(i,j) is greater than or equal to zero, then the superpixel luminance S0(i,j) is less than or equal to some predetermined brightness threshold $T_B$ and no luminance adjustment is necessary for that superpixel. The low resolution luminance correction value $\delta_{LO}$, and SIZE(i,j) are both set equal to zero in block 162. However, if S1(i,j) is less than zero in block 150, then the luminance S0(i,j) is greater than the brightness threshold $T_B$ and the superpixel must be darkened. At this point in time it is necessary to determine what degree of darkening is necessary for the superpixel of interest. This is done by increasing the size of the neighborhood around the superpixel by increasing the radius of the search of the pixels surrounding the superpixel of interest, then individually testing in blocks 152, 154, 156 and 158 each of the surrounding low resolution pixels against the brightness threshold $T_B$. An average low resolution luminance correction value $\delta_{LO}$ for the superpixel of interest is determined in blocks 164, 166, 168, 170 and 160 by averaging the luminance of all the low resolution pixels of the superpixel.

Block 152 tests if S1 is less than zero for all low resolution pixels of the 3×3 group as shown in FIG. 5B. If block 152 is false for any of these pixels, then SIZE(i,j) is set equal to −1 and the low resolution luminance correction value $\delta_{LO}$ is set equal to S1(i,j) in block 164. If block 152 is true for all of the low resolution pixels of FIG. 5B, then a larger group of surrounding low resolution pixels will be tested in block 154. Block 154 tests if S1 is less than zero for all 25 low resolution pixels of FIG. 5C. If block 154 is false for any low resolution pixel of FIG. 5C, then block 166 sets SIZE(i,j) equal to −2 and the low resolution luminance correction value $\delta_{LO}$ equal to 1/9 of the value of all the low resolution pixels within the 3×3 region according to equation (2).

If block 154 is true for all the low resolution pixels of FIG. 5C, then a larger group of surrounding low resolution pixels will be tested in block 156. If block 156 is false for any low resolution pixel of FIG. 5D, then block 168 sets SIZE(i,j) equal to −3 and the low resolution luminance correction value $\delta_{LO}$ equal to the average value of all the low resolution pixels in the 5×5 region according to equation (3). If block 156 is true for all pixels of FIG. 5D, then a larger group of surrounding low resolution pixels will be tested in block 158. If block 158 is false for any low resolution pixel of FIG. 5E, then block 170 sets SIZE(i,j) equal to −4 and the low resolution luminance correction value $\delta_{LO}$ equal to the average value of all the low resolution pixels in the 7×7 region according to equation (4). If block 158 is true for all pixels of FIG. 5E, then block 160 sets SIZE(i,j) to −5 and the low resolution luminance correction value $\delta_{LO}$ equal to the average value of all the low resolution pixels in the 9×9 region as shown in equation (5).

The outputs to blocks 162, 164, 166, 168 and 170 all feed into block 172 which generates a smoothing function such as the one given in equation (6). The luminance S0(i,j) is then adjusted in block 172 so that S0(i,j)=S0(i,j)+SMOOTH(k) *$\delta_{LO}$(i,j).

Figure 6:
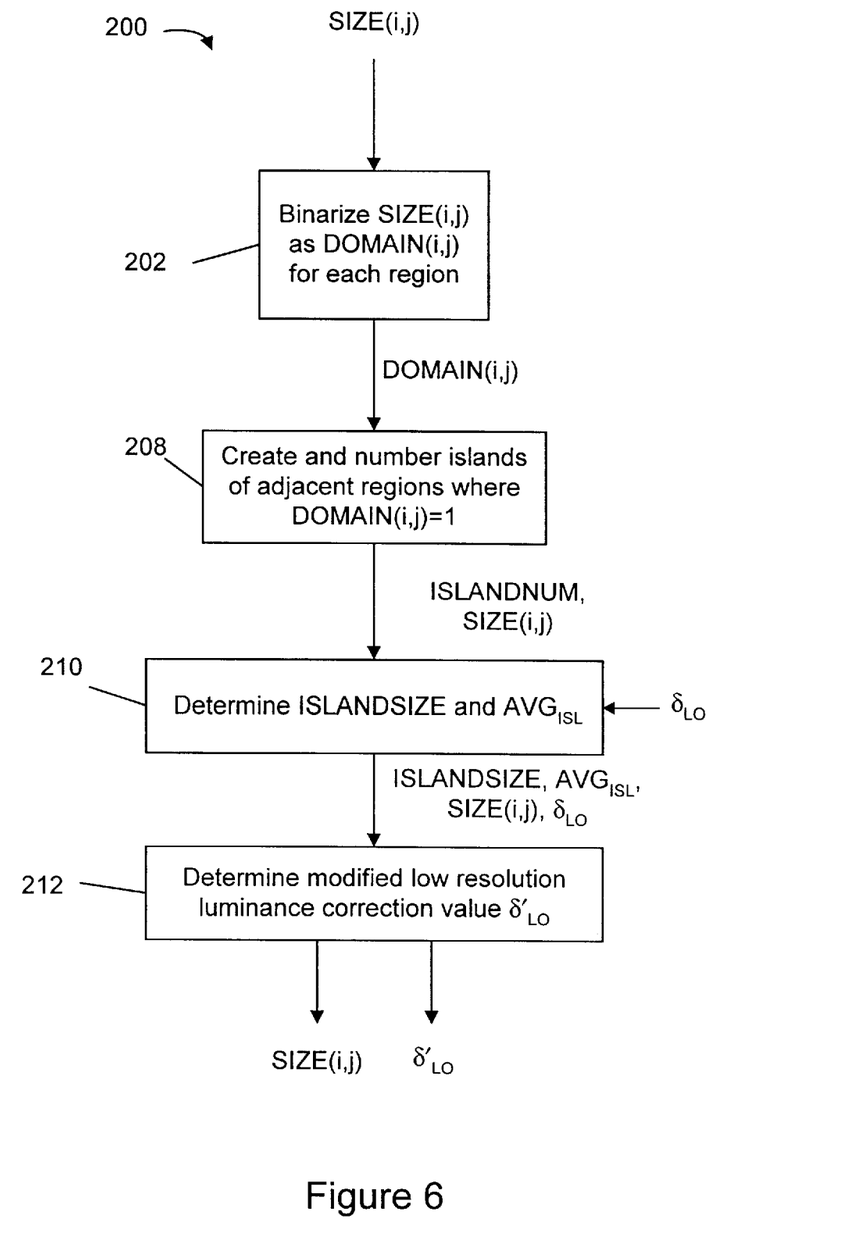
FIG. 6 is a flow diagram of block 200 of the method of FIG. 2.
Figure 7A:
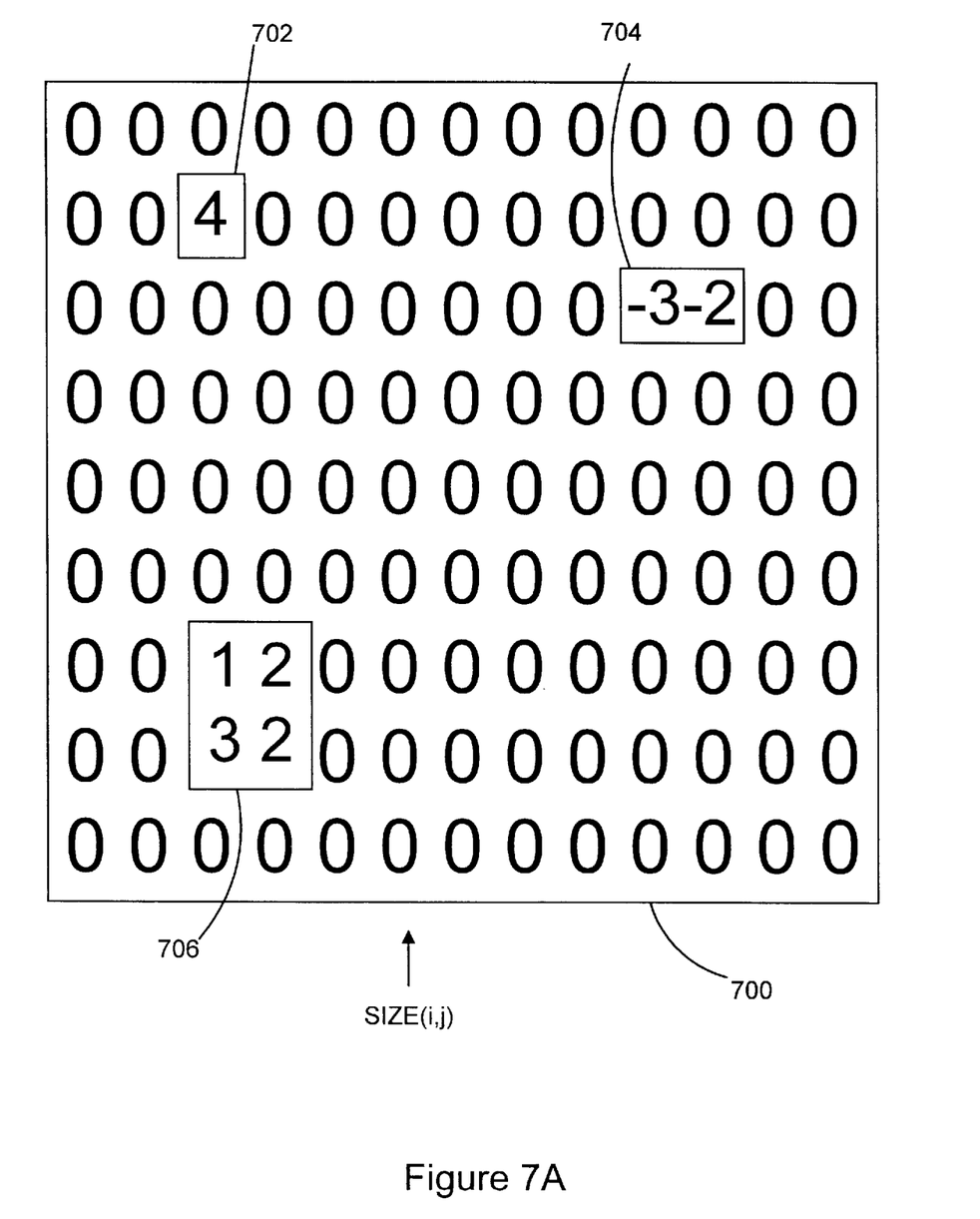
FIG. 7A is a representation of SIZE(i,j) values in an image.
Figure 7B:
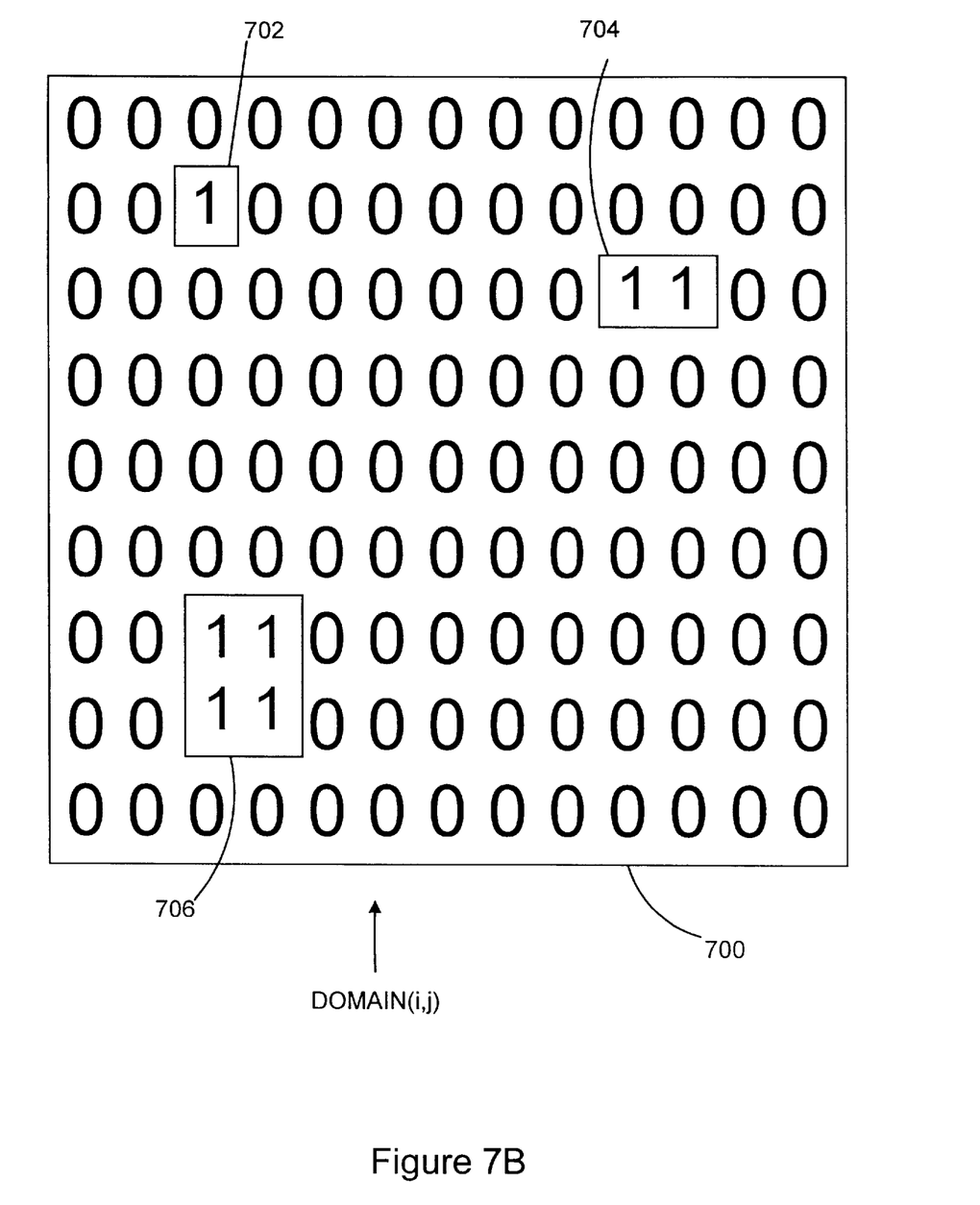
FIG. 7B is a representation of DOMAIN(i,j) values of an image.

The second part 200 of the inventive luminance adjustment method, shown in FIG. 6, creates islands of adjacent regions which all require luminance adjustment, as well as determining a modified low resolution luminance correction value $\delta'_{LO}$. First, SIZE(i,j) is binarized for each region in block 202, i.e. given a value DOMAIN(i,j) equal to 0 or 1, according to the following rule: if SIZE(i,j)=0, then DOMAIN(i,j) is set equal to 0; otherwise, if SIZE(i,j)≠0, then DOMAIN(i,j) is set equal to 1. In other words, DOMAIN(i,j) is set to 1 in the locations of the superpixels that require luminance correction. An example of that is shown in FIGS. 7A and 7B. FIG. 7A shows SIZE values for superpixels in an image 700 and FIG. 7B shows corresponding DOMAIN values for the superpixels. For instance, FIG. 7A shows a value SIZE=−3 for one element of region 704. The corresponding element in block 704 of FIG. 7B has a value DOMAIN=1, since SIZE≠0 according to the above rule. The other element of region 704 in FIG. 7A has a value SIZE=−2 so again, according to the above rule, SIZE≠0 and the corresponding element in block 704 of FIG. 7B has a value DOMAIN=1. The results of the binarization of SIZE for each superpixel of FIG. 7A are shown as superpixel DOMAIN values in FIG. 7B.

Block 208 creates and numbers, i.e. labels, islands of adjacent regions where DOMAIN(i,j)=1. A collection of superpixels are said to form an island if all the elements in the island are connected to one or more other elements in the island. FIG. 7B shows an example with three islands where each island is labeled with a number (in this case 702, 704 and 706). ISLANDNUM 706 in FIG. 7B is an island of four adjacent elements or superpixels; ISLANDNUM 704 is an island of two adjacent superpixels; and ISLANDNUM 702 is an island of one superpixel.

After creating and labeling each island, block 210 generates two parameters labeled ISLANDSIZE and $AVG_{ISL}$. ISLANDSIZE is calculated for each island, and is defined as the maximum value of SIZE(i,j) within the given island.

$$\text{ISLANDSIZE(of ISLANDNUM)} = \max \text{SIZE}(i,j) \tag{7}$$

where (i,j)∈ISLANDNUM. For instance, if the four elements of ISLANDNUM 706 in FIG. 7A have SIZE values of 1, 3, 2 and 2 as shown, then ISLANDSIZE=3 for ISLANDNUM 706. The value $AVG_{ISL}$ is calculated for each separate island and is defined as the sum of the low resolution luminance correction values $\delta_{LO}$ for each island divided by the number of elements in the island. Mathematically for each ISLANDNUM, $$AVG_{ISL} = \frac{1}{N} \sum_{(i,j)} \delta_{LO}(i,j) \tag{8}$$

where (i,j)∈ISLANDNUM.

In block 212 the modified low resolution luminance correction value $\delta'_{LO}$ is generated utilizing a smoothing function for providing smooth luminance transition between adjacent regions of the image. One such smoothing function is shown in equation (9).

$$\text{SMOOTH(ISLANDSIZE)} = \{\text{ISLANDSIZE}-1\}^R \tag{9}$$

where R is a rational number less than 1. Thus, the modified low resolution luminance correction value $\delta'_{LO}$ for each region is determined as $$\delta'_{LO} = \text{SMOOTH(ISLANDSIZE)} * AVQ_{ISL} \tag{10}$$

Figure 8:
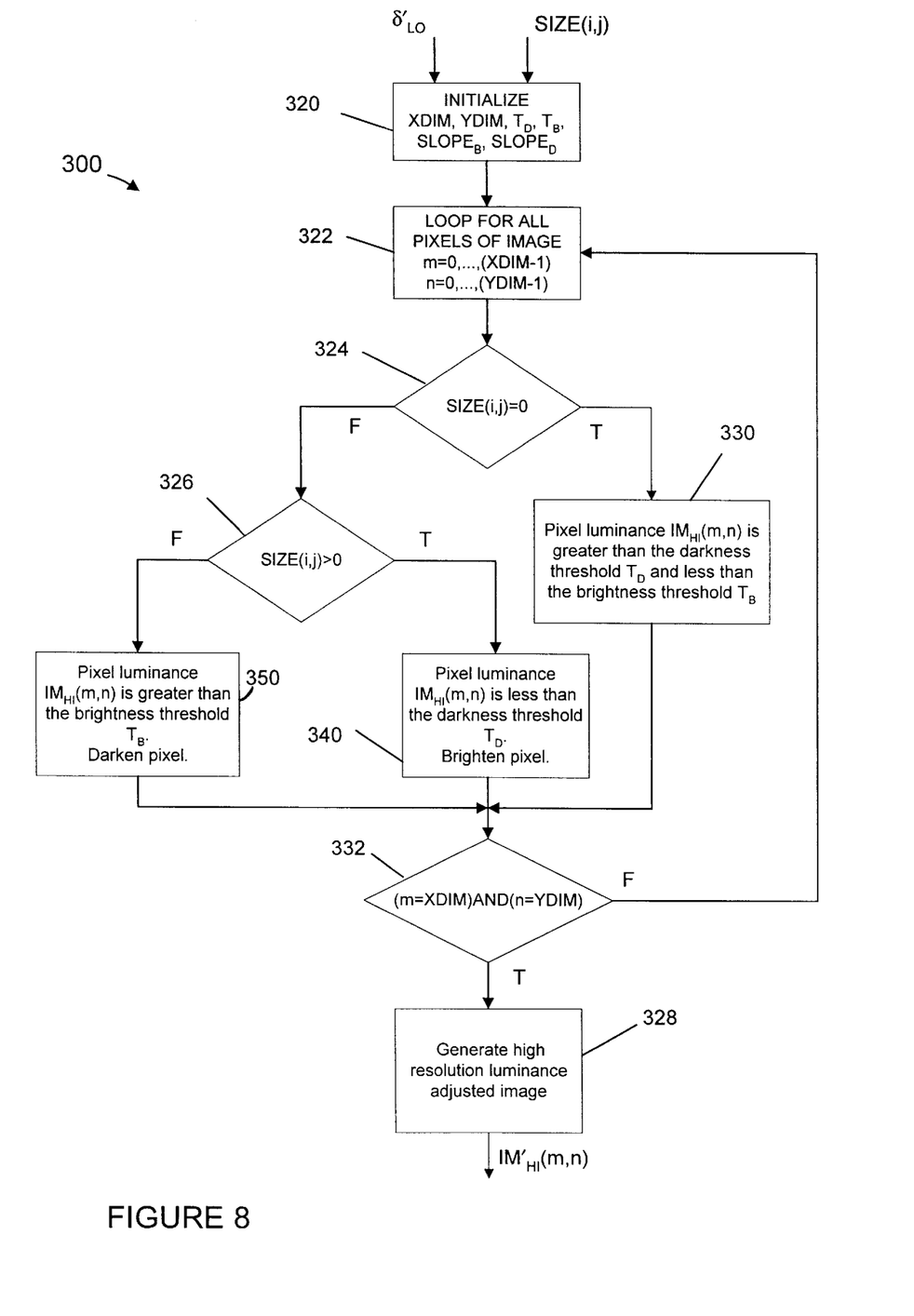
FIG. 8 is a flow diagram of block 300 of the method of FIG. 2.

The third part 300 of the inventive luminance adjustment method, detailed in FIG. 8, calculates a high resolution luminance correction value $\delta_{HI}$ to be added to the luminance $IM_{HI}$(m,n) for each pixel of the high resolution image $IM_{HI}$ which in turn allows the generation of a high resolution luminance adjusted image $IM'_{HI}$, where 0≤m<XDIM and 0≤n<YDIM. Constants XDIM, YDIM, $T_D$, $T_B$, $SLOPE_B$ and $SLOPE_D$ are initialized in block 320. The value of XDIM is the total number of rows of high resolution pixels in the image; YDIM is the total number of columns of high resolution pixels in the image; $T_D$ is the predetermined darkness threshold; $T_B$ is the predetermined brightness threshold; $SLOPE_B$ pertains to the transition or smoothing between a bright pixel having a luminance greater than $T_B$ and an adjacent pixel; and $SLOPE_D$ pertains to the transition or smoothing between a dark pixel having a luminance less than $T_B$ and an adjacent pixel.

Each pixel of the high resolution image will be tested in block 300 via the loop between blocks 332 and 322. The variables m and n are incremented in either block 322 or 332 after each pass through the loop until the condition of block 332 is true, at which time all pixels within the image have been tested and the process moves on to block 340.

If the pixel of interest at location (m,n), which is being tested in decision block 324, is within a region where SIZE=0, then the luminance $IM_{HI}(m,n)$ of the pixel is both greater than or equal to the darkness threshold $T_D$ and less than or equal to the brightness threshold $T_B$. The process thereafter continues in block 330. However, if SIZE≠0 in block 324, then block 326 tests whether SIZE>0. If block 326 is true, then the luminance $IM_{HI}(m,n)$ of the given high resolution pixel is too low (i.e. less than the darkness threshold $T_D$) and the high resolution pixel will be brightened in block 340. If block 326 is false, then SIZE<0 and the luminance $IM_{HI}(m,n)$ of the given high resolution pixel is too high (i.e. greater than the brightness threshold $T_B$), so that the pixel will be darkened in block 350. Once every pixel of the high resolution image $IM_{HI}$ has been processed as described above, then the complete image can be reconstructed in block 328, including of course all the appropriate corrections $\delta_{HI}$.

Figure 9:
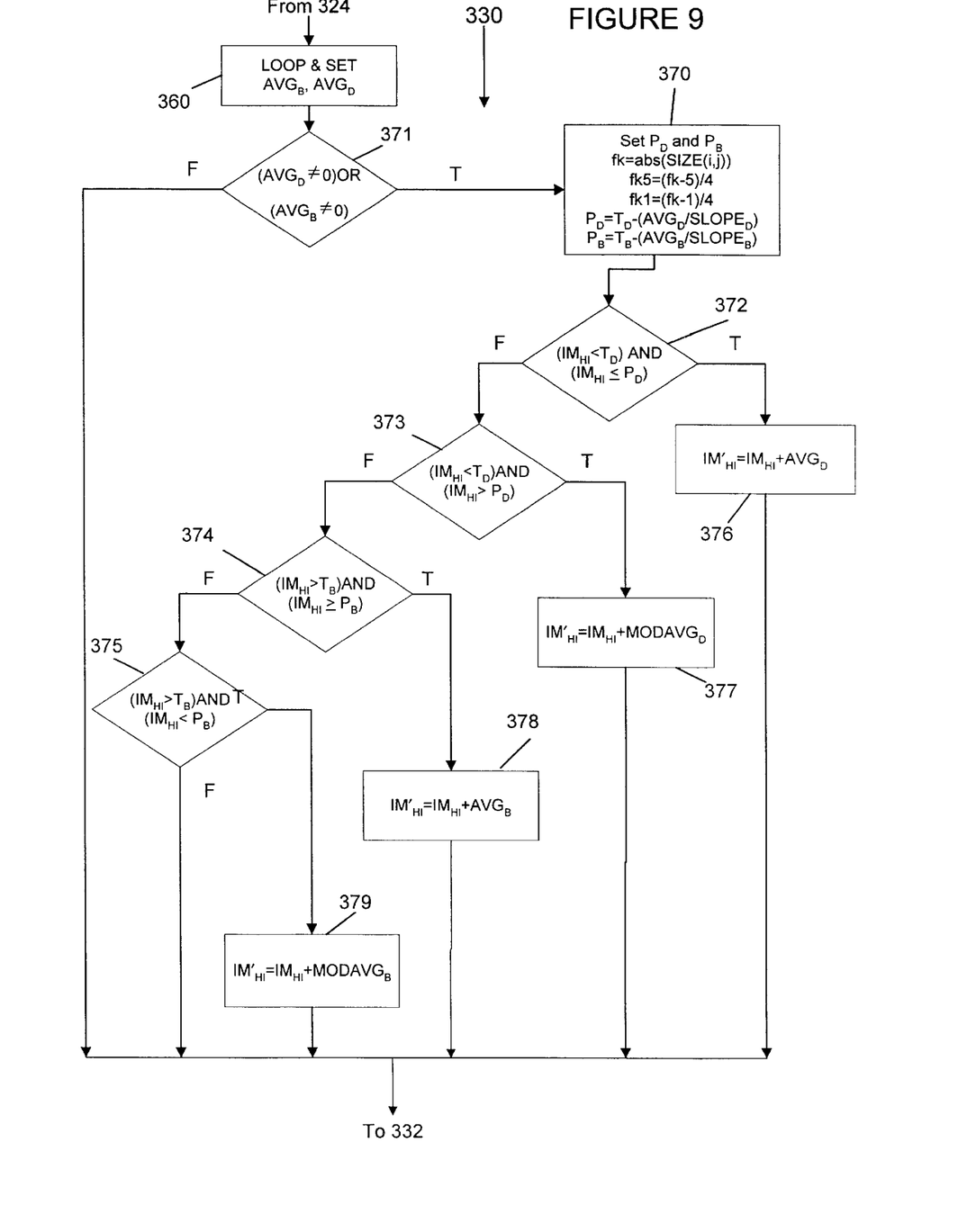
FIG. 9 is a flow diagram of the steps within block 330 that occur when the high resolution pixel luminance $IM_{HI}(m,n)$ is greater than the darkness threshold $T_D$ and less than the brightness threshold $T_B$.
Figure 10:
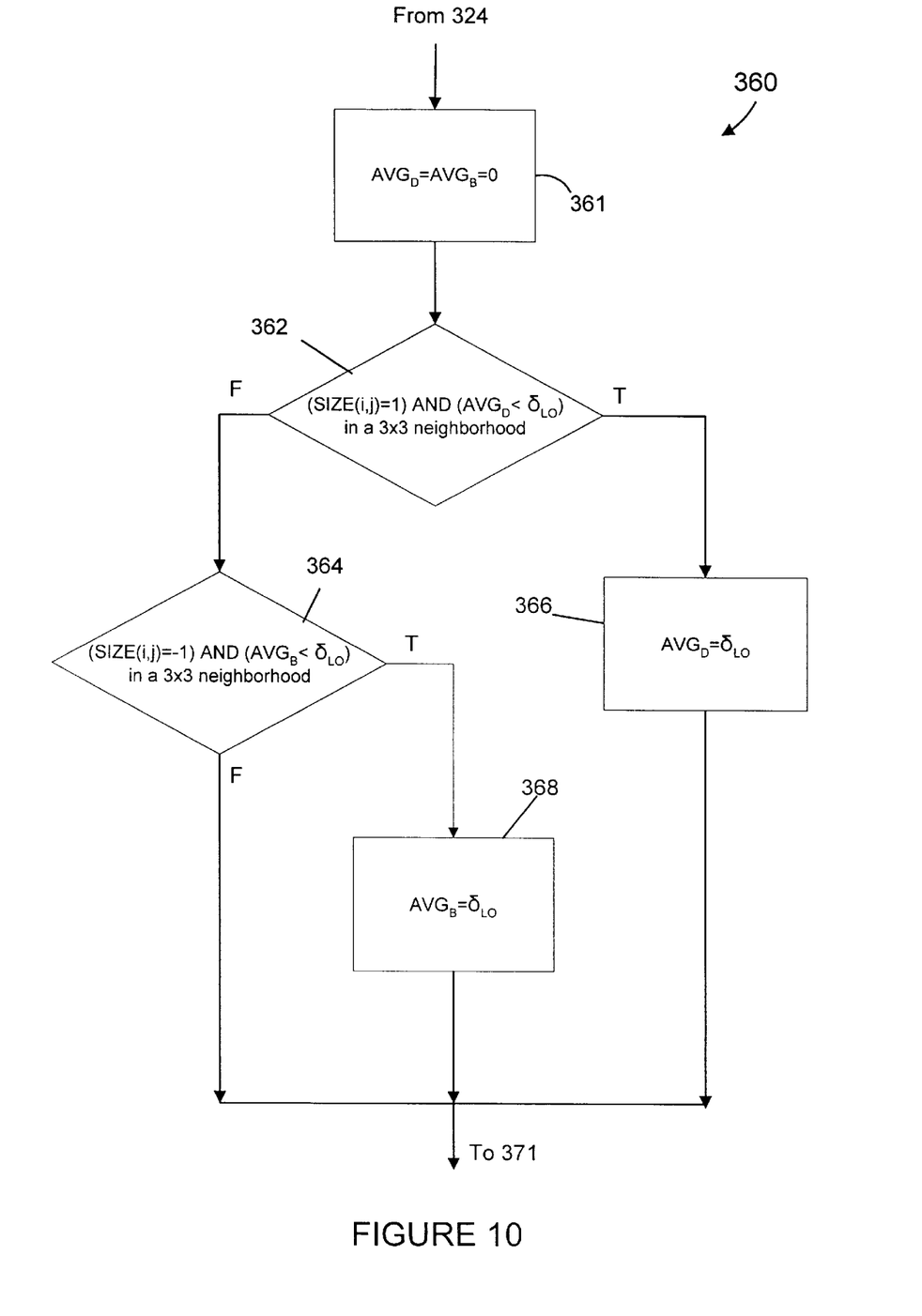
FIG. 10 is a flow diagram of the steps within block 360 for setting $AVG_B$ and $AVG_D$ levels for a high resolution pixel.

FIG. 9 is a detailed flow diagram of the steps involved in block 330 when the luminance of a high resolution pixel is both greater than or equal to the darkness threshold $T_D$ and less than or equal to the brightness threshold $T_B$. Block 360 sets both $AVG_B$ and $AVG_D$ to zero and loops within a specified neighborhood for each pixel of the high resolution image $IM_{HI}\{XDIM,YDIM\}$. $AVG_D$ is a variable to indicate that the pixel being tested is in the transition region between SIZE=0 and SIZE=1. $AVG_B$ is a variable to indicate that the pixel being tested is in the transition region between SIZE=0 and SIZE=−1. Both $AVG_D$ and $AVG_B$ are set to the non-zero value of the corresponding $\delta_{LO}$. The details of block 360 are shown in FIG. 10 where both $AVG_B$ and $AVG_D$ are first initialized to zero in block 361. Decision block 362 determines whether the average luminance $AVG_D$ of pixels in a 3×3 neighborhood (in which the subject high resolution pixel is centered) is less than the low resolution luminance correction value $\delta_{LO}$. If block 362 is true, then the average luminance $AVG_D$ is set equal to the low resolution correction value $\delta_{LO}$ in block 366. If block 362 is false, then decision block 364 determines whether the average luminance $AVG_B$ of pixels in a 3×3 neighborhood (in which the subject high resolution pixel is centered) is greater than the low resolution luminance correction value $\delta_{LO}$. If block 364 is true, then the average luminance $AVG_B$ is set equal to the low resolution correction value $\delta_{LO}$ in block 368.

Once $AVG_B$ and $AVG_D$ are set in block 360, then decision block 371 shown in FIG. 9 determines whether either $AVG_D \neq 0$ or $AVG_B \neq 0$. If block 371 is false, then the process continues to block 332. However, if block 371 is true, then variables $P_D$ and $P_B$ are set in block 370. $P_D$ is an estimated value of the difference in luminance between the pixel of interest and the darkness threshold $T_D$. $P_B$ is an estimated value of the difference in luminance between the pixel of interest and the brightness threshold $T_B$. In block 370, $$FK = abs(SIZE(i,j)) \tag{11}$$

$$FK5 = (FK-5)/4 \tag{12}$$

$$FK1 = (FK-1)/4 \tag{13}$$

$$P_D = T_D - (AVG_D/SLOPE_D) \tag{14}$$

$$P_B = T_B - (AVG_B/SLOPE_B) \tag{15}$$

The variables FK, FK5, FK1, $P_D$ and $P_B$ are used for feathering $\delta_{LO}$ to ensure smooth transition between pixels. Feathering is defined as smoothly combining portions of an image, i.e. integrating portions of an image while ensuring a smooth transition therebetween. FK, FK1 and FK5 are particularly used for feathering within regions having different SIZE values.

Once $P_D$ and $P_B$ are set in block 370, then decision block 372 determines whether the pixel luminance value $IM_{HI}(m,n)$ is both less than the darkness threshold $T_D$, and less than or equal to $P_D$. If block 372 is true, then block 376 adjusts the high resolution pixel luminance value $IM_{HI}(m,n)$ by $AVG_D$. If block 372 is false, then decision block 373 determines whether the high resolution pixel luminance value $IM_{HI}(m,n)$ is both less than the darkness threshold $T_D$ and greater than $P_D$. If block 373 is true, then block 377 adjusts the pixel luminance value $IM_{HI}(m,n)$ by the modified dark level luminance average $MODAVG_D$.

$$MODAVG_D = AVG_D * ((T_D - IM_{HI}(m,n))/(T_D - P_D)) \tag{16}$$

If block 373 is false, then decision block 374 determines whether the pixel luminance value $IM_{HI}(m,n)$ is both greater than the brightness threshold $T_B$ and greater than or equal to $P_B$. If block 374 is true, then block 378 adjusts the pixel luminance value $IM_{HI}(m,n)$ by the average bright level luminance $AVG_B$. If block 374 is false, then decision block 375 determines whether the pixel luminance value $IM_{HI}(m,n)$ is both greater than the brightness threshold $T_B$ and less than $P_B$. If block 375 is true, then block 379 adjusts the pixel luminance value $IM_{HI}(m,n)$ by the modified luminance average $MODAVG_B$.

$$MODAVG_B = AVG_B * ((T_B - IM_{HI}(m,n))/(T_B - P_B)) \tag{17}$$

If block 375 is false, then the method continues with block 332.

Returning to FIG. 8, if the luminance value of any high resolution pixel is too dark, i.e. below the darkness threshold $T_D$, then that pixel is brightened in block 340 by raising its luminance level by $\delta_{HI}$. The details of this operation are shown in the flow diagram of FIG. 11. Block 380 sets FK=abs(SIZE(i,j)); FK1=(FK−1)/4; FK5=(FK−5)/4; and $P_D = T_D - (\delta_{LO}/SLOPE_D)$. All of these variables have been previously defined.

Figure 11:
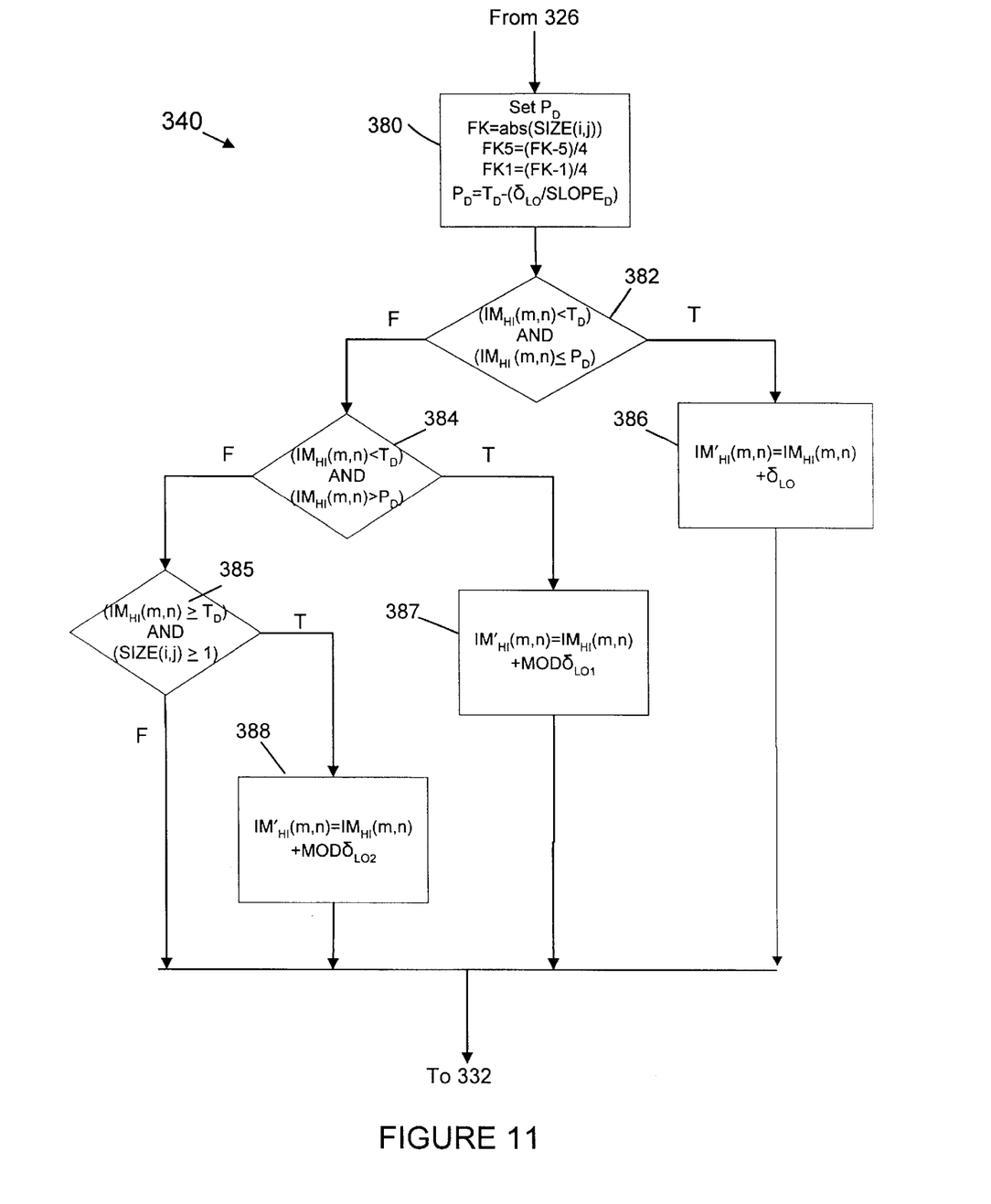
FIG. 11 is a flow diagram of the steps within block 340 for brightening a high resolution pixel when the luminance $IM_{HI}(m,n)$ of the pixel is less than the darkness threshold $T_D$.

In decision block 382, if the luminance value of the high resolution pixel of interest is both less than the darkness threshold $T_D$ and less than or equal to $P_D$, then block 386 adjusts the luminance value by adding $\delta_{LO}$ to the original luminance value. If the inquiry of block 382 is false, then decision block 384 tests whether the luminance is both less than the darkness threshold $T_D$ and greater than $P_D$. If block 384 is true, then block 387 adjusts the luminance value of the corresponding pixel by adding $MOD\delta_{LO1}$ to $IM_{HI}(m,n)$.

$$MOD\delta_{LO1} = \delta_{LO} * (T_D + FK5 * IM_{HI}(m,n) - FK1 * P_D)/(T_D - P_D) \tag{18}$$

If block 384 is false, then decision block 385 determines whether both the high resolution pixel luminance is greater than or equal to darkness threshold $T_D$ and SIZE≧1. If block 385 is true, then the high resolution pixel luminance is adjusted by adding MOD$\delta_{LO2}$ to the original pixel luminance.

$$MOD\delta_{LO2}=\delta'_{LO}*(T_D+FK5*T_D-FK1*P_D)/(T_D-P_D) \quad (19)$$

If block 385 is false, then the process continues with block 332.

If the luminance value of a high resolution pixel is too bright, i.e. above the brightness threshold $T_B$, then that pixel is darkened in block 350 by lowering its luminance level. The details of this operation are shown in the flow diagram of FIG. 12. Block 390 sets FK=abs(SIZE(i,j)), FK1=(FK−1)/4 and FK5=(FK−5)/4. Also, $P_B=T_B-(\delta_{LO}/SLOPE_B)$.

Figure 12:
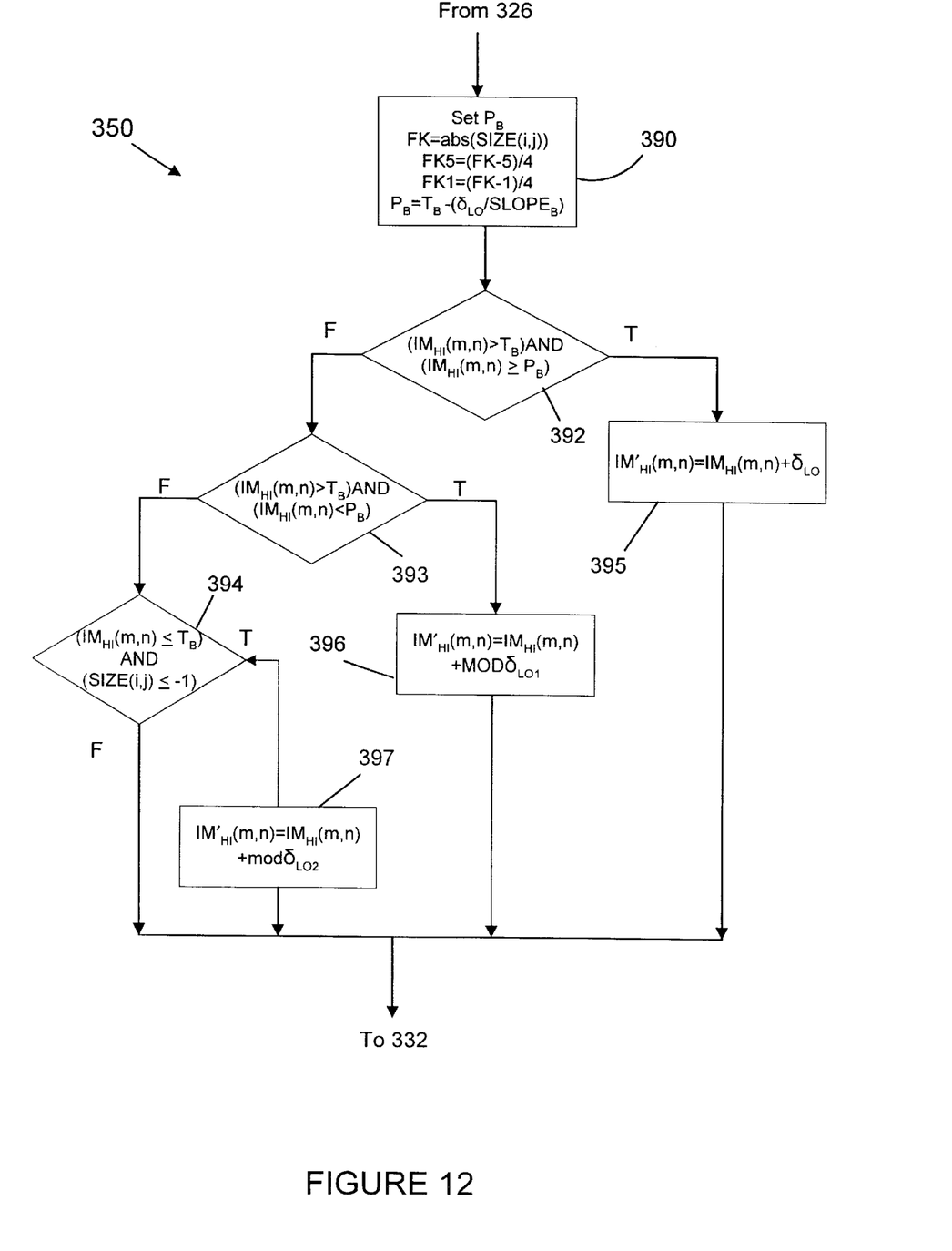
FIG. 12 is a flow diagram of the steps of block 340 for darkening a high resolution pixel when the luminance $IM_{HI}(m,n)$ of the pixel is greater than the brightness threshold $T_B$.

Decision block 392 determines if the high resolution pixel luminance is both greater than brightness threshold $T_B$ and greater than or equal to $P_B$. If block 392 is true, then the high resolution pixel luminance is adjusted by adding $\delta_{LO}$ to the original high resolution pixel luminance in block 395. If block 392 is false, decision block 393 determines whether the high resolution pixel luminance is both greater than brightness threshold $T_B$ and less than $P_B$. If block 393 is true, then the high resolution pixel luminance is adjusted in block 396 by adding the modified correction value MOD$\delta_{LO3}$ to the original pixel luminance value.

$$MOD\delta_{LO3}=\delta'_{LO}*(T_B+FK5*IM_{HI}(m,n)-FK1*P_B)/(T_B-P_B) \quad (20)$$

If block 393 is not true, then decision block 394 determines whether both the pixel luminance is less than or equal to the brightness threshold $T_B$ and SIZE$\leq -1$. If block 394 is true, then the high resolution pixel luminance is adjusted in block 397 by adding the modified correction value MOD$\delta_{LO4}$ to the original high resolution pixel luminance.

$$MOD\delta_{LO4}=\delta'_{LO}*(T_B+FK5*T_B-FK1*P_B)/(T_B-P_B) \quad (21)$$

If block 394 is false, then the process continues with block 332.

Note that the third part 300 of the inventive method calculates the high resolution correction value $\delta_{HI}$ (as indicated in FIG. 2) for each pixel of the original image. Each pixel in the image is thereafter adjusted by $\delta_{HI}$ to form a new luminance adjusted image.

While there has been described what at present are considered to be the preferred embodiments of the present invention it will be apparent to those skilled in the art that various changes and modifications may be made therein without departing from the invention and it is intended in the accompanying claims to cover all such changes and modifications as fall within the true spirit and scope of the invention.

What is claimed is:

1. A method for adjusting luminance values $IM_{HI}$ of pixels in a high resolution image, comprising the steps of:

forming a low resolution image of said high resolution image by grouping the pixels into superpixels;

for selected said superpixels having luminance values exceeding a predetermined threshold value, generating non-zero low resolution luminance correction values $\delta_{LO}$ by averaging luminance values of superpixels surrounding each said selected superpixel;

generating a modified low resolution correction value $\delta'_{LO}$ for each said selected superpixel by forming islands of adjacent said selected superpixels and smoothing $\delta_{LO}$ between said adjacent selected superpixels within each island;

generating a high resolution luminance correction value $\delta_{HI}$ for each pixel of the high resolution image by comparing the luminance values $IM_{HI}$ of each said pixel to said predetermined threshold value and generating $\delta_{HI}$ as a function of both $IM_{HI}$ and $\delta_{LO}$; and generating a luminance adjusted image by combining the luminance values $IM_{HI}$ of each said pixel with said corresponding high resolution luminance correction value $\delta_{HI}$.

2. The method of claim 1, wherein said predetermined threshold value is one of a darkness threshold $T_D$ and a brightness threshold $T_B$.

3. A method for adjusting luminance values of pixels of an image, comprising the steps of:

forming a low resolution version of said image by grouping said pixels into superpixels according to a predetermined pixel classification;

generating a low resolution correction value $\delta_{LO}$ for each said superpixel by comparing a luminance value of each superpixel to a predetermined threshold value;

generating a modified low resolution correction value $\delta'_{LO}$ for each said superpixel by smoothing $\delta_{LO}$ between neighboring superpixels;

generating a high resolution correction value $\delta_{HI}$ for each of said pixels as a function of both said corresponding superpixel luminance value and $\delta_{LO}$; and generating the adjusted luminance values of pixels of the image by combining $\delta_{HI}$ with the luminance value for each pixel.

4. The method of claim 3, wherein said predetermined threshold value is one of a darkness threshold $T_D$ and a brightness threshold $T_B$.

5. A system for pixel level luminance adjustment of an image, comprising:

means for forming a low resolution image of said high resolution image by grouping the pixels into superpixels;

means for generating non-zero low resolution luminance correction values $\delta_{LO}$ for selected said superpixels having luminance values exceeding a predetermined threshold value, by averaging luminance values of superpixels surrounding each said selected superpixel;

means for generating a modified low resolution correction value $\delta'_{LO}$ for each said selected superpixel by forming islands of adjacent said selected superpixels and smoothing $\delta_{LO}$ between said adjacent selected superpixels within each island;

means for generating a high resolution luminance correction value $\delta_{HI}$ for each pixel of the high resolution image by comparing the luminance values $IM_{HI}$ of each said pixel of the image to said predetermined threshold value and generating $\delta_{HI}$ as a function of both corresponding values $IM_{HI}$ and $\delta_{LO}$; and means for generating a luminance adjusted image by combining said luminance values $IM^{HI}$ of each said pixel with said corresponding high resolution luminance correction value $\delta_{HI}$.

6. The system of claim 5, wherein said predetermined threshold value is one of a darkness threshold $T_D$ and a brightness threshold $T_B$.

* * * * *